(No Model.)
A. W. COX.
SPRING LINK AND BAR FOR CHAINS.
No. 347,422. Patented Aug. 17, 1886.
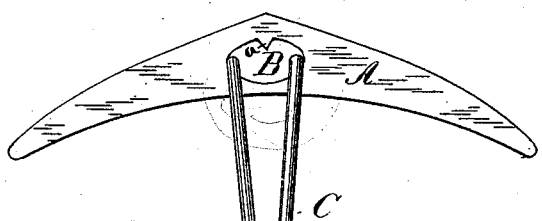
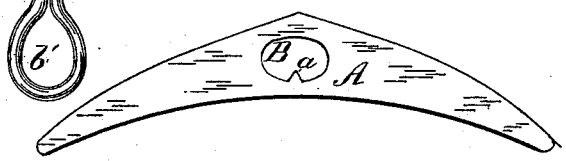
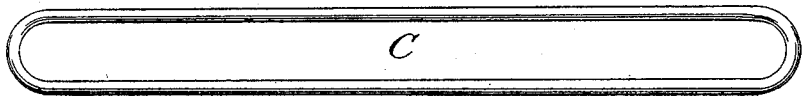
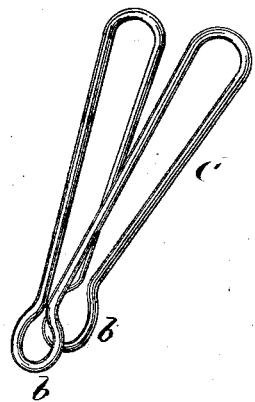
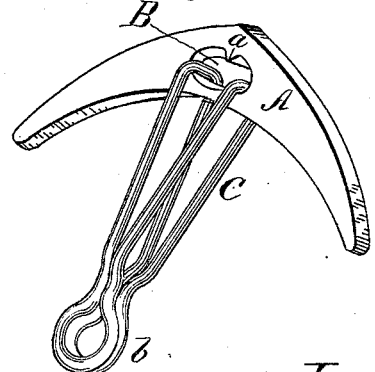
Attest:
N. D. Harrington.
Ed. J. Underwood
Inventor:
Albert W. Cox
by W. J. Johnston
Attorney.

UNITED STATES PATENT OFFICE.

ALBERT W. COX, OF HASTINGS, NEBRASKA.

SPRING LINK AND BAR FOR CHAINS.

SPECIFICATION forming part of Letters Patent No. 347,422, dated August 17, 1886.

Application filed February 25, 1886. Serial No. 193,187. (No model.)

*To all whom it may concern:*

Be it known that I, ALBERT W. COX, a citizen of the United States, residing at Hastings, in the county of Adams and State of Nebraska, have invented certain new and useful Improvements in Spring Links and Bars for Chains; and I do declare the following to be a full, clear, and exact description of the invention, such as will enable others skilled in the art to which it appertains to make and use the same, reference being had to the accompanying drawings, and to the letters and figures of reference marked thereon, which form part of this specification.

My invention relates to an improvement in spring links and bars for harness and other chains; and it consists in certain details of construction and arrangement hereinafter more specifically described, and pointed out in the accompanying drawings, in which—

Figure 1 represents a joint elevation of my improved link and bar. Fig. 2 represents a single rod or wire bent to form an ordinary link, and having its ends welded or united. Fig. 3 represents said link doubled over from its center, having its ends brought nearly together, and each pressed in shape to form a holding-ring. Fig. 4 is a detail view of the bar detached. Fig. 5 is a perspective view of the complete device, showing the link and bar ready to be attached to a chain.

This invention is intended as an improvement upon my former patents, Nos. 327,865 and 328,292, and my pending application; and its object is to provide a spring-link and cross-bar at the minimum cost, wherein the cross-bar will at all times maintain a position at right angles with the line of the chain when in its normal position, and prevent the chain from becoming accidentally loosened or detached when secured, in the ordinary manner, by passing the bar through an opening or link.

Referring more particularly to the drawings, A represents a curved cross-bar, provided in its center with an elongated slot, B, having a projection, a, extending inwardly at its center from either its upper or lower side, as shown in Figs. 1 and 4.

C represents a double spring-link formed from a single rod or wire, first bent to form an ordinary plain link, as shown at Fig. 2, with its ends united, then doubled back from its center, and its ends brought near together, as shown in Fig. 3. One end of the looped link is then passed through the slot B of the bar A until it occupies the position shown in Figs. 1 and 5, with its double-looped end occupying the slot B in the cross-bar, the separate loops bearing against opposite ends of the slot. The opposite ends, $b\ b$, of the link are then closed together and may be firmly welded or not, as deemed desirable, forming a holding-ring, as shown at Fig. 5, by means of which the device may be attached to a strap or chain.

I have found from experiment and practice that this form of link affords greater satisfaction than either of those employed in my former inventions covered by Letters Patent and pending application, and, besides, is more cheaply and easily constructed from a single rod or wire and attached to the cross-bar, while as a spring-link it is in all respects equal, if not superior, to the other forms.

The inwardly-projecting lug $a$, located in the center of the upper or lower side of the slot B of the cross-bar, operates as a fulcrum upon the spring-link when the cross-bar is turned to a line with the chain, causing one of the spring-loops to bear outwardly at an oblique angle at the instant the other comes in contact with the projection, and thereby causes the greatest force of the spring to be exerted in forcing the bar back to its normal position at right angles with the link.

Having thus described my invention, what I claim, and desire to secure by Letters Patent, is—

1. In a holding device for harness and chains, the combination, with a curved cross-bar having an elongated central opening provided with an inwardly-projecting lug, of a link formed from a single rod or wire bent to form a double-looped spring at one end and a holding-ring at the other, substantially as and for the purpose set forth.

2. In a holding device for harness and chains, a link formed from a single rod or wire first bent to form an ordinary plain link, then doubled over upon its center and its ends united and formed into a holding-ring, in combination with a cross-bar provided with a central elongated opening, substantially as and for the purpose set forth.

In testimony whereof I affix my signature in presence of two witnesses.

ALBERT W. COX.

Witnesses:
NEWTON B. LOVEJOY,
EMMA M. GILLETT.